United States Patent [19]

Maglieri

[11] Patent Number: 5,255,875
[45] Date of Patent: Oct. 26, 1993

[54] PROTECTIVE HARDSIDE COVERS FOR VEHICLE SURFACES

[75] Inventor: John M. Maglieri, Hayes, Va.

[73] Assignee: The United States of America as represented by the Secretary of the Army, Washington, D.C.

[21] Appl. No.: 876,536

[22] Filed: Apr. 30, 1992

[51] Int. Cl.5 .......................... B64D 7/00; B60J 11/00
[52] U.S. Cl. ..................................... 244/121; 114/361; 160/370.2 A; 296/95.1; 296/97.8; 296/98
[58] Field of Search ............... 244/1 R, 121; 114/361; 160/370.2; 150/106; 296/95.1, 97.7, 97.8, 98

[56] References Cited

U.S. PATENT DOCUMENTS

| 2,962,184 | 11/1960 | Meier | 244/121 |
|---|---|---|---|
| 3,815,650 | 6/1974 | Hickey | 244/1 R |
| 4,041,999 | 8/1977 | Miller | 150/166 |
| 4,247,509 | 1/1981 | Talbot | 114/361 |
| 4,436,569 | 3/1984 | Somerfleck | 244/1 R |
| 4,598,883 | 7/1986 | Suter | 244/1 R |
| 4,606,516 | 8/1986 | Willison | 244/1 R |
| 4,734,312 | 3/1988 | Sugiyama | 150/166 |
| 4,763,783 | 8/1988 | Talbot | 150/166 |
| 4,951,993 | 8/1990 | Taboada | 160/370.2 |
| 4,968,085 | 11/1990 | Stann | 296/98 |

Primary Examiner—Michael S. Huppert
Assistant Examiner—Virna Lissi Ansley
Attorney, Agent, or Firm—John H. Lamming; Arthur H. Tischer

[57] ABSTRACT

A hard, semi-rigid cover for protecting vehicle surfaces from damage by exposure to the elements or chemical warfare agents is disclosed. A typical surface to be protected by a cover of the invention is a helicopter transparent canopy. Key features of the invention are a seal that forms around the cover perimeter where it fits snugly against the vehicle's outer surface and an air gap that exists between the inside surface of the cover and the vehicle's exterior surface. The cover is made of a moldable polymer material.

22 Claims, 6 Drawing Sheets

PROTECTIVE HARDSIDE COVERS FOR VEHICLE SURFACES

BACKGROUND OF THE INVENTION

1. Technical Field

This invention pertains to semi-rigid protective covers for portions of vehicles such as aircraft having surfaces that are particularly susceptible to damage from dirt, sand, ultraviolet radiation, chemical agents, and other airborne particulate hazards. In particular, the covers can be used to protect aircraft canopies from hail, blowing sand, dirt, dust, chemical agents, or ultraviolet radiation.

2. Description of Related Art

Vehicles in transit or storage are generally subject to a variety of environmental hazards. These hazards can have an adverse effect on surfaces, instruments, or components of a vehicle and thereby diminish or destroy the effectiveness of the vehicle in performing its intended mission. A surface that is susceptible to environmental degradation is the canopy of an airplane or helicopter. Erosion, which includes cracking, scratching, pitting, chafing and chemical alteration, of the canopy clear surfaces (by wind-blown sand, for example) can cause serious impairment of a pilot's field of vision outside the aircraft and thereby reduce or eliminate the fitness of the machine for flying, absent repair or replacement of the clear cover. Such damage can occur while an aircraft is be4ing shipped aboard another vehicle (by ship, rail or truck, for example), while it is parked between missions, or while it is in storage. Other surfaces present similarly serious potential risks. Delicate instruments, such as radar equipment, missile guidance systems, optical devices used in reconnaissance, can suffer serious harm and have their effectiveness impaired by exposure to the forces of nature or synthetic destructive agents.

A variety of vehicles can benefit from the protection afforded by the covers of the present invention. Examples are: civil and military aircraft (fixed wing and helicopters) and terrestrial vehicles such as trucks, buses and automobiles. Military vehicles in particular are often subjected to harsh conditions for prolonged periods under stresses not normally experienced by civil aircraft. The severe conditions encountered in desert terrains provide a good example of the kinds of environmental hazards that vehicles, and especially military vehicles such as tanks, personnel carriers, fixed-wing aircraft and helicopters, may encounter for sustained periods of time. Military vehicles may also be the targets of chemical agents designed to impair or destroy their effectiveness by damaging surfaces, instruments or components necessary for their proper and efficient operation.

The prior art discloses several attempts that have been made to deal with the risks posed to vehicles, especially aircraft, by environmental hazards. One approach calls for applying a heat-shrinkable plastic wrap to the contours of the aircraft's exterior surface and heating the wrap to fit snugly against the surface to be protected. This approach is described in U.S. Pat. No. 4,763,783. According to this usage, a wrap can be selected that is impermeable to ultraviolet radiation as well as to seawater, rain and dirt. Similar technology may be applied to other vehicles, such as boats, as illustrated in U.S. Pat. No. 4,247,509. The coverings described in these two methods are not reusable, but are to be discarded after each use.

To similar effect is an airtight envelope taught in U.S. Pat. No. 3,815,650. The envelope is made of a flexible material, impermeable to dirt and moisture. The seams of the envelope are hermetically sealed and the space between the hermetically sealed envelope and the vehicle body may be evacuated with a pump. The envelope may thus be made to conform to the vehicle exterior and fit tightly against it. Alternatively, an inert gas such as nitrogen may be pumped into the envelope after evacuation to create an air cushion between the envelope and the vehicle body as well as a clean environment free of corrosive agents.

A reusable protective covering for aircraft has been devised which uses pads of protective foam, as described in U.S. Pat. No. 4,598,883. In this apparatus, protective foam is laid on horizontal surfaces, such as the wings of an airplane, and secured with straps encircling the wing. The straps are to be drawn tightly enough against the foam to compress the foam directly beneath the strap to create an air space between the surface of the wing and the pad. The air spaces thus formed are intended to prevent accumulation of moisture underneath the reusable protective cover and alleviate any damage that might be wrought thereby.

Finally, reusable protective coverings can be molded out of plastic with precision to adhere closely to the surface of an aircraft body or an appendage, such as a radome or a missile. U.S. Pat. No. 4,436,569. Protective coverings of this nature are particularly useful for preventing damage to delicate electronic components, such as radar equipment or the guidance avionics in the nose of a rocket or missile, from rain erosion while an airplane is in high-speed flight.

Other protective means for parking, storage or shipment of vehicles include canvas wraps or plastic sheeting. While these and the other previously described means for protecting vehicles, especially military vehicles, provide adequate means of protection against some hazards, it is desirable to provide protective coverings which are effective against a wider range of hazards. For example, some covers described above are ineffective against impact from hail. Others would be ineffective against agents to be expected during a chemical attack by enemy forces or harmful airborne or waterborne pollution. Some are ineffective against windblown sand and dirt and possess no means to prevent damage to the vehicle surface from chafing, scratching or abrasion by such particulate matter that may lodge between the protective covering and the vehicle outer surface. It is also desirable to provide protective means which can be installed easily and swiftly by one or two crew, that are light of weight and easy to handle, and which require a minimum of storage space. It is also desirable to provide protective covering means capable of avoiding the build-up of heat to extremely high temperatures in desert and tropical climates.

The present invention overcomes many of the disadvantages of the above-described vehicle covers by providing hardside canopy covers for vehicle surfaces comprised of a molded polymer which conforms to the shape of the vehicle surface to be protected. The covers of the present invention can be installed in a relatively short period of time, by one or two people, and removal is just as expedient. The covers can be stacked for easy and compact storage. The covers of the present invention provide good protection from sand, dirt, dust, ultraviolet radiation (heat and deterioration), chemical damage (for example, acid rain and chemical munitions), and weather (wind, ice and hail, for example). The covers also provide an air space for thermal insulation against heat build-up in tropical or desert climates. Moreover, use of the present invention results in savings of time for installation, removal and storage, and savings on material costs in that the covers may be used and reused indefinitely. Fabrication costs are also extremely low.

SUMMARY OF THE INVENTION

The present invention solves the problems alluded to above by utilizing a hard, semi-rigid, reusable cover that forms a seal around its perimeter where it snugly fits the outer surface of the vehicle being protected and that provides a gap of air between the inside surface of the cover and the vehicle outer surface to be protected. The air gap prevents temperature build-up under the cover and also allows any abrasive particulate matter which may have been introduced under the cover to fall harmlessly to the junction between the perimeter of the cover and the side of the vehicle to avoid damage to the protected surface from scratching or chafing. The seal protects the vehicle surface area lying under the cover from erosion by airborne particulate matter and chemical reagents. The cover is fabricated of material that is impermeable to water and airborne particulate matter (sand, dust, dirt) and is sufficiently hard to withstand wind-blown hazards (such as sleet and hail), even in high winds. The cover material is also resistant to penetration by ultraviolet radiation, which may degrade some surfaces, such as the transparent canopy plexiglass of a helicopter. In one of its embodiments the cover utilized is fabricated from a material that in addition to the foregoing properties is also resistant to damage (distortion, dissolution, dilution or permeation, for example) by contact with organic reagents, such as the types that are used in various chemical warfare agents. In another embodiment ribs, which are indentations in the cover surface that are concave with respect to the outer vehicle protected surface, are molded into the cover to provide extra structural strength and to provide additional air space. Different means for securing the cover to the protected vehicle are disclosed. In yet other embodiments, additional sealing means are disclosed. The cover is easy to install and remove and may be stacked with other like covers for space-efficient storage. Typical materials from which the cover of the invention may be fabricated are polymers and copolymers. Examples are polypropylene and polyethylene. The invention is also directed to a method for protecting vehicle surfaces from potential hazards including water, dirt, dust, sand, wind, hail, sleet, intense sunlight, heat build-up, scratching, abrasion, chafing and chemical reagents.

BRIEF DESCRIPTION OF THE DRAWINGS

These and other features and advantages of the present invention will be better understood by reference to the detailed description which follows, when considered in connection with the accompanying drawings described briefly below. For the purpose of illustrating the invention the embodiments presently preferred are shown, it being understood that the invention is not limited to the specific methods and instrumentalities disclosed. Like reference numerals in the drawings indicate like elements throughout. In the drawings.

DESCRIPTION OF THE PREFERRED EMBODIMENTS

Figure 1:
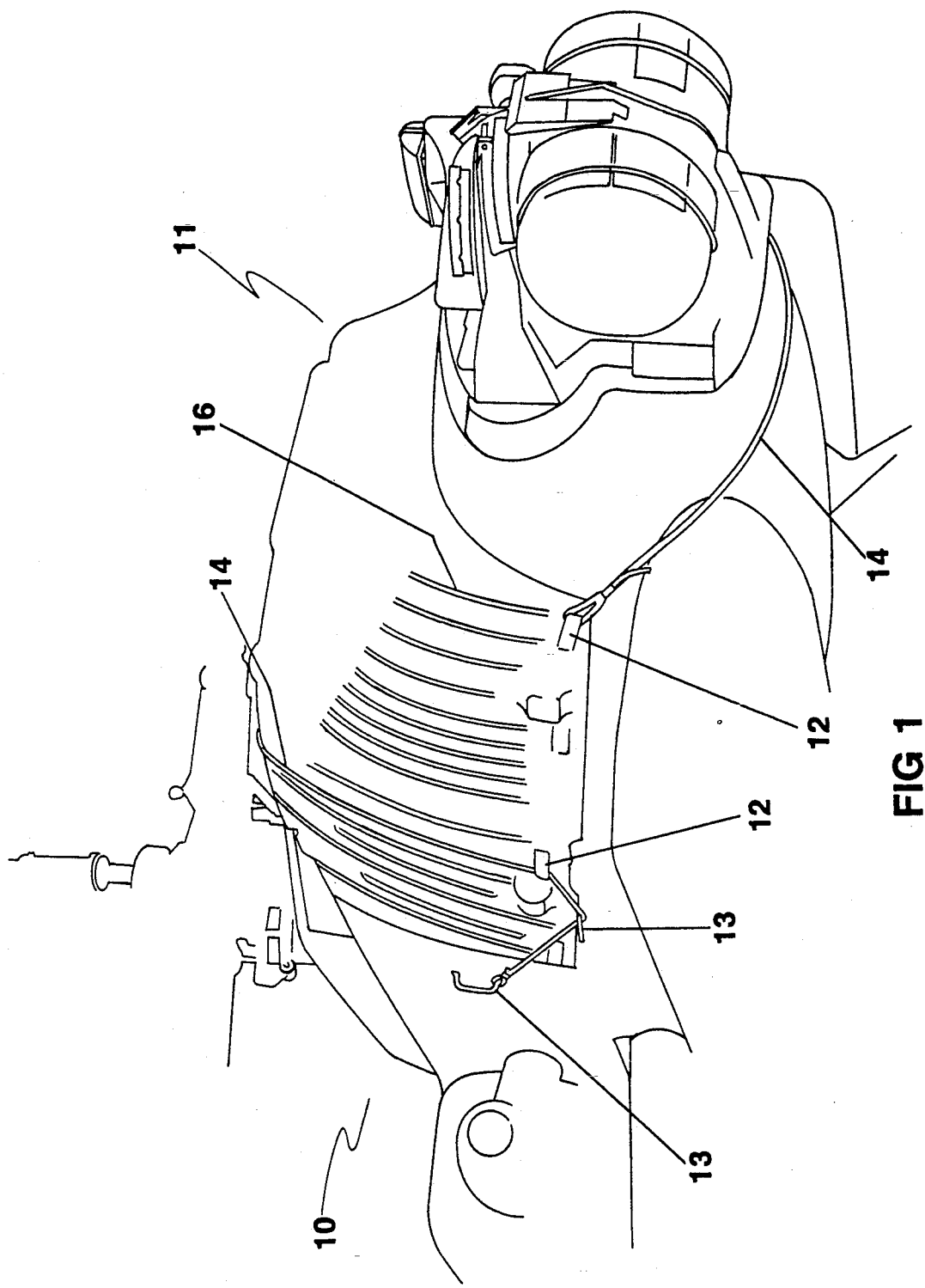
FIG. 1 is a profile drawing of a protective hardside cover of this invention for protecting a helicopter canopy.

Certain terms used in the descriptions and claims below may have a special meaning applied to the protective hardside covers of the present invention. These terms are used consistently throughout the descriptions and claims which follow. Several of these terms are discussed briefly below to elucidate their meaning herein:

Air space or gap: As used herein, "space" and "gap" are deemed to be synonymous. The space is a discrete space that exists by virtue of the shape, dimensions and topological features of the cover which are congruent to the same features on the vehicle surface to be protected. Thus, when the cover is in place and secured to the exterior of the vehicle, a discrete air gap exists between the exterior portion of the vehicle surface to be protected and the protective hardside cover of the invention except where the perimeter of the cover is brought into contact with the vehicle surface at a junction where the area under the cover is sealed against intrusion of foreign matter, and any optional hard points.

Hard point: An indentation in the surface of the protective cover which is convex to the vehicle surface. The hard point is used either to help maintain a seal between the cover and the vehicle surface at the junction, or to provide structural support and maintain the desired air space. The hard point must rest on a non-critical surface such as the metal frame of a transparent canopy cover.

Junction: This term is synonymous with "sealing junction" as also used herein. The junction is the point at which the perimeter of the cover contacts the exterior surface of the vehicle in a snug fit to provide a seal against intrusion of foreign matter underneath the cover.

Rib: An indentation in the surface of the cover which is concave to the protected surface of the vehicle and protrudes from the surface of the cover on the exterior side. When ribs are molded into the cover sheet, the cover thus has a base inside surface and a rib inside surface. This is clearly shown in FIGS. 3(a) through 3(d) wherein the reference numeral 11 points directly to a base inside surface portion on each example. Ribs are an optional feature of the protective covers of the invention which provide additional structural rigidity when needed. Ribs also create additional air space between the cover and the protected surface.

Seal: In the basic embodiment the seal results from the snug fit of the cover with the vehicle surface. The purpose of the seal is to prevent intrusion of foreign matter: sand, dust, dirt or chemicals, for example, between the cover and the surface to be protected. A seal may be enhanced by other means, described in further detail below, such as a compressible rubber pad fixed to the perimeter of the cover, mated VELCRO is a registered trademark; the fastener is generically known as a hook-and-loop fabric-like fastener strips, or a hard point around the perimeter.

Semi-rigid: The minimum hardness required to withstand anticipated forces from wind, wind-blown particles, hail or other anticipated hazards, and to maintain shape in exposure to extremes of temperature. The term includes all rigidity and hardness in excess of the minimum, thus including the concept of "rigid" within it.

Figure 2:
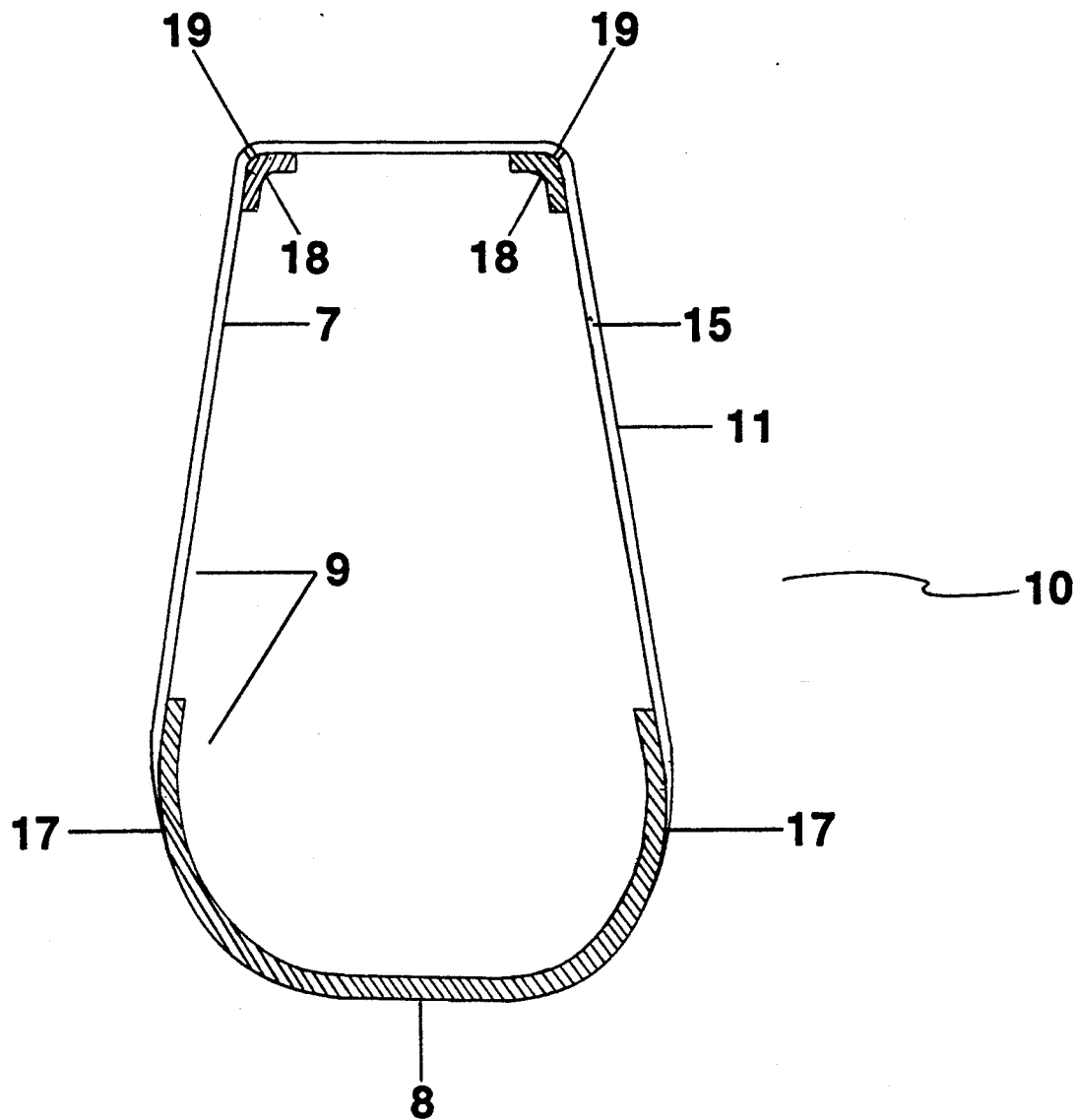
FIG. 2 is a head-on cut-away profile of a helicopter and a protective hardside cover of the present invention, also for protecting a helicopter canopy.
Figure 3:
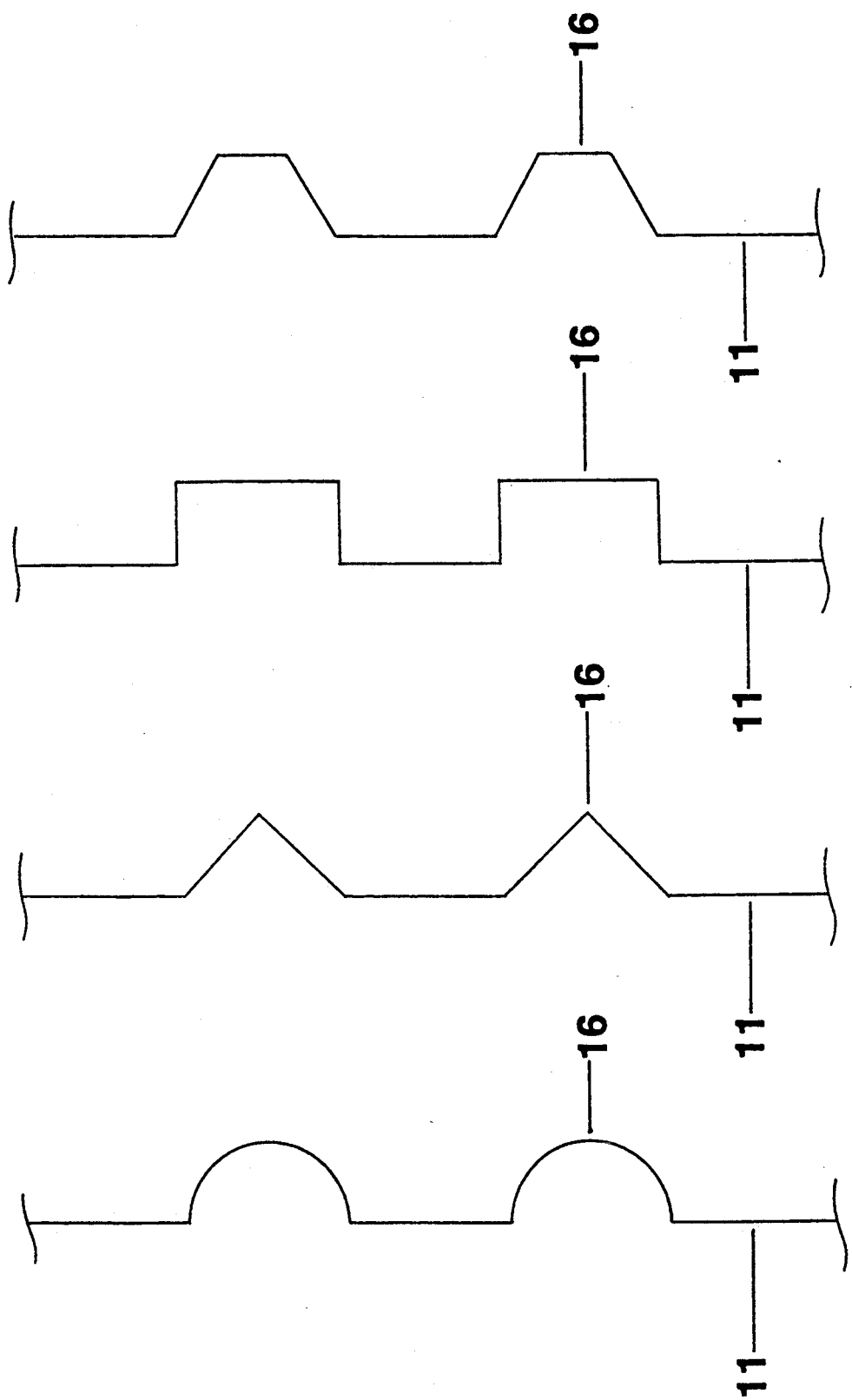
FIG. 3(a) through 3(d) show in cross-section some of the geometric forms that the reinforcing ribs may have.

Referring to the drawings, FIG. 1 shows a profile perspective view of a rotary wing aircraft having a protective hardside canopy cover 11 of the present invention. The aircraft shown in FIG. 1 is a U.S. Army AH-64 Apache helicopter 10; the head-on cross-section of FIG. 2 depicts in outline form the fuselage and canopy areas of an AH-64 Apache helicopter, sectioned through the aerodynamic "flat plate" area of the forward fuselage. However, it should be clearly understood that the hardside cover and the method of the present inventi,on are equally applicable to any type of assembled aircraft including rotary wing or fixed wing, large or small size aircraft, VSTOL aircraft, and helicopters of all types. The cover and the method are also equally applicable to vehicles other than aircraft, such as tanks, trucks, buses or automobiles. The vehicles to which the cover and the method of the invention may be applied include civil as well as military vehicles. It will also be understood by those skilled in the art that the present invention is applicable for protectively covering any desired portion or portions of vehicles such as fixed or rotary wing aircraft, automobiles, tanks, trucks, or other vehicles. Depending on the needs of particular circumstances, it may be desirable to cover the transparent canopy area of an airplane or sensitive exterior areas of electronic instruments mounted on the body of an airplane or other vehicle. In some instances, more than one like or different portion of the same vehicle may be covered.

The present invention uses semi-rigid material such as plastic which can be molded to a shape and dimensions which are congruent to the outer contours of a vehicle body surface portion to be protected by the hardside covers presented herein. The cover is molded to be congruent to all of the contour and topological features of the surface over which it will be placed. By the cover being congruent to the vehicle surface to be protected it is meant that the cover is molded to have a shape, topological features and dimensions in a specific tolerance range with the shape, topological features and dimensions of the surface of the vehicle to be protected so that the cover, when installed in its place on the vehicle, will fit in a manner so as to provide a discrete air space or gap between the vehicle outer surface to be protected and the inside surface of the cover and also to provide a sealing junction where the perimeter of the cover and the surface of the vehicle touch. Thus, the cover will be "bubbled" to allow it to fit over door handles, hinges, windshield wipers, and other similar obstructions. Because most vehicles have distinct topological characteristics and unique size and shape features associated with the critical areas that would require the protection offered by the covers of this invention, the covers once formed are unique to a particular style or model of vehicle.

Various materials may be used to make the molded covers. The particular material used may be created or chosen for the demands of a particular environment or for special conditions. The material must be suitable for thermoplastic vacuum molding or rotational molding and must be moldable to close tolerance fit in critical areas. It is preferred that the covers of the invention have a unitary (one-piece) structure, although the cover may be formed of more than one piece to facilitate installation and removal where the topology of the area to be protected so requires. Suitable materials must be able to withstand erosion from wind-blown sand and dirt, must resist ultraviolet radiation, and may be resistant to damage by chemical munitions if desired. Examples of suitable materials are cross-linked polyethylene and polypropylene.

The material chosen will be capable of providing some structural rigidity for the cover. Structural rigidity must be sufficient to maintain an air space 15 over the protected surface for thermal insulation, to hold cockpit area temperatures down, and to prevent chafing of the vehicle surface 9 in the event that any abrasive particulate matter should become lodged under the cover. In addition, ribs 16 shown in both FIG. 1 and in detailed cross-section in FIGS. 3(a)-3(d), provide additional structural integrity for the cover and also provide some additional air space 15 for the purposes described immediately above. Instead of abrading the surface in that event, the particulate matter will fall harmlessly to the bottom of the cover. It is preferred that the rib be substantially uniform in shape, width and depth around the extent that they may be molded into the cover. In the preferred embodiment, the ribs 16 should have a depth of at least 0.5 inch and no more than 1.5 inches measured from the inside surface of the cover. Preferably, the depth of the ribbing will be 0.5 to 0.75 inch. The width of the rib 16 should be within the range of 0.5 inch to 1.0 inch with a range of 0.625 to 0.75 inch preferred. The spacing between ribs may vary; typically the spacing between ribs will be 6 inches to 8 inches measured from the center point of each neighboring rib (the point at maximum depth). It is to be noted that the ribs 16 as shown in the cover 11 of FIG. 1 have a directional grain in that they run in a substantially parallel manner across the surface, and the directional grain shown is transverse with respect to the longitudinal axis of the aircraft. Typically the ribs will run in a parallel direction and the directional grain chosen will be one that is most advantageous for the size and shape of the cover and the type of vehicle surface being protected. Variations will be indicated by the material used for the cover, the topology of the protected surface, the anticipated conditions in the area where the vehicle will be used, and the overall desired strength and rigidity.

While the cover must be molded to fit closely to the surface of the vehicle surface 9 to be protected, the cover should not fit the entire surface area snugly. In fact, the cover should be molded so that a gap of air space is created by allowing the base surface of the cover to lie up to 1.5 inch away from most of the surface to be protected. It is preferable that the air space created in this manner should have a width of 0.5 inch to 1.0 inch over most of the protected surface. However, the perimeter of the cover should fit closely and snugly to the vehicle surface around the entire perimeter of the cover to provide a seal against intrusion of foreign matter.

The thickness of the cover depends primarily on the inherent strength and rigidity of the material chosen, the size, quantity and spacing of ribs to be used for structural support, and the specific properties that the user desires the cover to possess. The material will generally be chosen on the basis of known properties. For example, polyethylene and polypropylene are two preferred materials. Either may be obtained commercially in the form of pellets which may be used in rotational molding processes, or sheets which are used in thermoplastic vacuum forming. They may also be obtained in copolymer form or as cross-linked polymers or copolymers possessing desirable characteristics for protective hardside vehicle covers. Basically, the preferred materials retain their structural strength in extremes of temperature, resist organic solvents, are impermeable to water and shed ultraviolet radiation, and have sufficient strength to withstand high winds and particles such as sand and dirt that may be driven by high winds. Cover thickness may range from 0.065 to 0.15 inch, with thickness in the range of 0.085 to 0.095 inch preferred.

Figure 5:
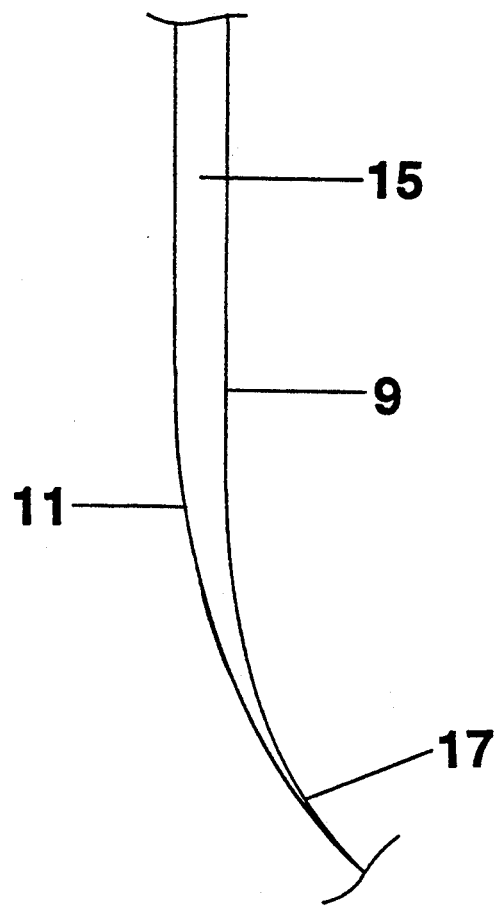
FIG. 5 is a partial cross-section of a junction of a protective hardside cover of the invention and an aircraft surface, showing the air space or gap between the cover and the vehicle surface above the sealing junction.
Figure 6:
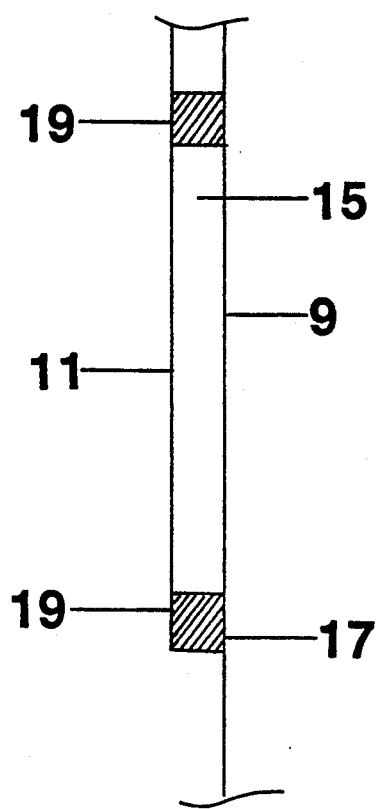
FIG. 6, like FIG. 5, shows a partial cross-section of a protective hardside cover of the invention and hard points used as sealing means at the perimeter portion and as spacing and support means in the cover interior portion above the sealing junction.

The other drawings indicate the manner in which the hardside covers of the invention 11 fit in relation to a helicopter 10, as an exemplary vehicle, and a protected surface 9 of said vehicle. FIG. 2 shows a head-on profile of a helicopter 10 to which a hardside canopy cover 11 of the invention has been mounted. As shown particularly in FIG. 2, the protected surface 9 consists mostly of the transparent canopy cover 7 and has some overlap with the metal side of the fuselage 8. Not shown in FIG. 2 are the means for securing the hardside cover to the vehicle, the main rotor shaft, the pylons, landing gear, and other auxiliary features of the aircraft. As shown in FIGS. 2 and 5, the hardside cover 11 of the invention may be sealed by the manner in which it fits snugly against the outside surface of the vehicle at junction 17. The pressure applied in securing the cover to the protected surface 9 at a junction 17 may be used to tighten the seal and to maintain the seal in winds or other externally applied forces. This is a pressure seal which relies upon the fit of the cover and the vehicle surface and force of the tightened securing means (again, not shown in FIGS. 2 and 5) to hold the perimeter of the cover snugly against the surface 9 of the vehicle at the junction point 17. FIGS. 2 and 5 also indicate the air gap 15 which is maintained between the protected surface 9 and the protective hardside cover 11 of the invention. The hardside cover 11 shown in each of FIGS. 2, 5 and 6 does not have ribs 16 as shown in FIGS. 1 and 3(a)-3(d), but a cover having reinforcing ribs would fit in exactly the manner as shown in FIGS. 2, 5 and 6. The invention in its preferred embodiment has reinforcing ribs 16, with semicircular ribs as depicted in cross-section in FIG. 3(a) being the most preferred. It is clearly understood by those skilled in the art that the depth, width and shape of the ribs 16 as well as the spacing between them on the surface of the hardside cover 11 and the extent to which ribs are molded onto the cover surface will vary according to the inherent rigidity of the material chosen for the cover and the desired rigidity and strength of the cover.

FIGS. 2 and 6 also show optional means for providing additional structural support for the cover and for maintaining the air gap 15 between the cover and the protected surface. The means thus shown are a hard point 19 in the two drawings. In the interior portion of the cover, the hard point 19 should be placed so that it does not come into contact with a clear portion of surface 9 such as the clear plexiglass canopy cover 7 of a helicopter 10 (FIG. 2). In FIG. 2 the hard point 19 is situated so that it rests upon a metal canopy frame member 18 of the transparent canopy 7. Although not shown in FIGS. 4 and 5, hard point spacer support means 19 can be used in the embodiments of the invention depicted in those two drawings, and all other features shown therein would remain the same with the addition of the hard points 19.

Different means may be used at the junction 17 formed by the perimeter of the hardside cover 11 and the protected surface 9 to form a seal at that point. For example, a hard point 19 may be molded on the surface of the cover 11 at the perimeter to help seal the cover at junction point 17, as shown in FIG. 6. Other means would include a compressible, resilient, chemical resistant rubber pad (not shown) in place of the hard point 19 shown in FIG. 6. Still another means would include a pad 23 and mating VELCRO strips 24 on the pad 23 affixed to the cover 11 and 24 affixed to the protected surface 9 at the junction point 17 around the entire perimeter.

Figure 4:
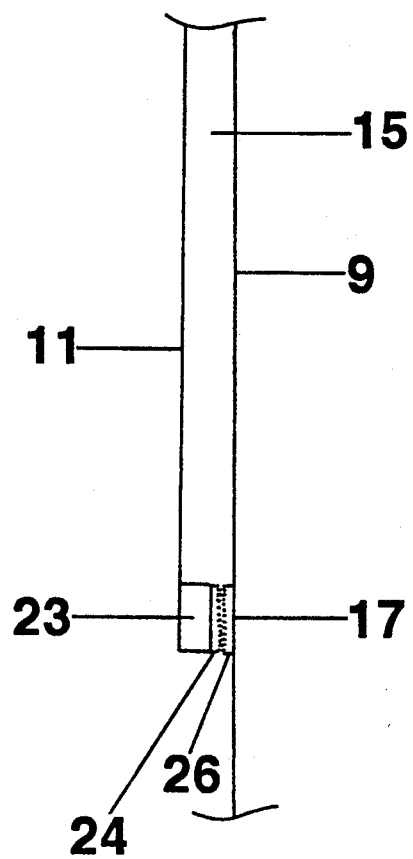
FIG. 4 depicts a sealing means at the junction of the perimeter of a protective hardside cover of the invention and an aircraft surface.

The manner in which the hardside canopy cover 11 depicted in FIG. 1 is secured to the vehicle will now be described as an illustration of how a cover of this general type may be secured to a vehicle. Since the aircraft shown in FIG. 1 is being used in this description, the particular word aircraft will be used in this discussion but it is understood that the securing or fastening means described here are equally applicable to other helicopter models, to other styles of aircraft and to other kinds of vehicles. A VELCRO strip around the interior of the cover 24 and a mating strip 26 on the aircraft as shown in FIG. 4 may be used to fasten the perimeter of the cover to the aircraft and also to seal the cover against the body of the aircraft to prevent particulate or chemical intrusion between the cover and the aircraft. Elastic cord or rope 14, such as bungee cord, can also be used to secure the cover to the aircraft. If VELCRO is used, elastic cord would be optional additional securing means. The cord 14 may be wrapped around the cover and secured to or passed through loops 12 molded into the cover and then secured to fixtures 13 on the aircraft body itself. While non-elastic securing means, such as rope or bands, may be used, and will secure the cover by tightening them sufficiently, elastic cord or rope means are preferred.

Experimental Section

Prototype covers fitting the U.S. Army AH-64 Apache helicopter were vacuum molded of plastic and tested for fit, chemical resistivity, environmental protection, and ease of installation and removal. The tests performed establish the utility of the cover. The procedures employed and the results achieved will be described briefly below.

Fabrication. Two prototype hardside canopy covers were made for U.S. Army's AH-64 Apache helicopter. The covers were made with hand formed wooden vacuum molds, fabricated of molded polypropylene. The material had a uniform thickness of 0.092 inches. Reinforcing ribs were spaced from 6 inches to 8 inches apart around the entire surface of the cover; the ribs were given a depth of 0.5 inch and a width of 0.625 inch to 0.75 inch. The ribs were molded with a semicircular shape in cross-section. The completed prototype cover had a net weight of 35 pounds (not counting attachment means such as the elastic bungee cord).

Chemical Resistivity. Polypropylene material molded into a hardside canopy cover for an air vehicle was directly contacted with a pure or 100% solution of methylethyl ketone and observed for varying periods of time from 1 second to ten minutes. Contact was made by immersing a sheet of the material into a container containing the pure solution of methylethyl ketone. After immersion for the varying periods of time the material was removed from the container and examined for any distortion, dissolution, dilution or permeation of the material. Methylethyl ketone was chosen as a solvent because it is a common organic solvent and is typically employed as a simulator for worst case scenarios of chemical weapon damage. The concentration applied in the tests is far higher than that to which a hardside canopy cover protecting an aircraft in a theater of operations would be exposed. In two replications of the test at Fort Eustis, Virginia in May 1991 no damage to the hardside cover material was observed.

Thermal Insulation. A hardside cover was mounted on an aircraft and the aircraft was parked outdoors with temperature monitoring equipment in the cockpit. Portable thermocouples (K-type wire; chromel/allumel) were placed inside the cockpit and the temperature recorded at a remote location. The tests were performed at Fort Eustis, Virginia and at Fort Irwin, California in May 1991 and July 1991, respectively. A control craft, not covered with a prototype hardside canopy cover of the invention, was also monitored for heat build-up in the cockpit, using the same temperature monitoring equipment as the test aircraft. The tests indicated a temperature differential of 400° to 800° F. between the covered vehicle and the control vehicle under identical circumstances.

Installation and Removal. Soldiers at Fort Irwin, California were drilled on the installation and removal of the hardside cover of the invention using an AH-64 Apache helicopter. Repeated drills showed that two soldiers could install the cover on an AH-64 helicopter in about one minute. Removal was equally expedient. One-person installation or removal is feasible but takes longer.

From the foregoing descriptions it can be seen that the present invention comprises hardside canopy covers for vehicle surfaces. While particular embodiments of the invention have been described herein, those skilled in the art could make minor changes to those embodiments without departing from the broad scope of the inventive concept disclosed in the invention. It is understood, then, that this invention is not intended to be limited to the particular embodiments disclosed herein, but is intended to cover all modifications which are within the scope and spirit of the invention as defined by the following claims.

What is claimed is:

1. A removable, reusable protective hardside cover for vehicle surfaces comprising:
   a. a hardside cover portion formed of a sheet of moldable, hard, semi-rigid material impermeable to moistur and resistant to penetration by ultraviolet radiation, shape and form that are congruent to the vehicle s which it fits so that an air space of substantially uniform w between the outer vehicle surface to be protected side surface of the hardside cover portion, the width of sidair space being not less than 0.5 inch nor more than 1.5 inch over most of the protected surface, and so that the perimeter of the hardside cover portion and the outer vehicle portion touch snugly to form a junction; and
   b. means or securing the cover to the vehicle being protected.

2. The protective hardside cover for vehicle surfaces of claim 1 in which the hardside cover portion sheet has molded into the surface thereof a multiplicity of ribs which are concave with respect to the vehicle surface to be protected, thus providing a base inside surface of the cover and a rib inside surface of the cover, and which are substantially parallel to each other.

3. The protective hardside cover for vehicle surfaces of claim 2 in which the means for securing the cover to the vehicle being protected comprise rope means.

4. The protective hardside cover for vehicle surfaces of claim 3 in which the ropes means are elastic.

5. The protective hardside cover for vehicle surfaces of claim 2 in which the moldable, semi-rigid hardside cover portion material is capable of resisting damage thereto by organic chemical agents.

6. The protective hardside cover for vehicle surfaces of claim 1 in which the air space between the outer vehicle surface to be protected and the inside surface of the hardside cover portion is not less than 0.5 inch nor more than 1.0 inch over most of the protected surface.

7. The protective hardside cover for vehicle surfaces of claim 2 in which the ribs have a maximum depth of from 0.5 to 1.5 inches measured from the base inside surface of the cover.

8. The protective hardside cover for vehicle surfaces of claim 2 in which the ribs have a maximum depth of from 0.5 to 0.75 inch measured from the base inside surface of the cover.

9. The protective hardside cover for vehicle surfaces of claim 2 in which the ribs have a width of from 0.5 to 1.0 inch.

10. The protective hardside cover for vehicle surfaces of claim 2 in which the ribs have a width of from 0.625 to 0.75 inch.

11. The protective hardside cover for vehicle surfaces of claim 2 in which the air space between the outer vehicle surface to be protected and the base inside surface of the hardside cover portion is not less than 0.5 inch nor more than 1.5 inch over most of the protected surface, the ribs have a maximum depth of from 0.5 to 1.5 inches measured from the base inside surface of the cover, the ribs have a width of from 0.5 to 0.75 inch, and the ribs have a substantially semicircular shape.

12. The protective hardside cover for vehicle surfaces of claim 2 in which the air space between the outer vehicle surface to be protected and the base inside surface of the hardside cover portion is not less than 0.5 inch nor more than 1.0 inch over most of the protected surface, the ribs have a maximum depth of from 0.5 to 0.75 inch measured from the base inside surface of the cover, the ribs have a width of from 0.625 to 0.75 inch, and the ribs have a substantially semicircular shape.

13. The protective hardside cover for vehicle surfaces of claim 1 including hard point spacing and support means molded into the inside surface of the cover as a convex protrusion from the inside surface of the cover and situated on said inside surface so that they will touch a portion of the vehicle surface that is not a transparent surface.

14. The protective hardside cover for vehicle surfaces of claim 1 including further sealing means at the junction of the perimeter of the cover and the outer vehicle comprising a pad secured to the inner perimeter surface of the cover, a hook-and-loop fabric-like fastener strip mounted on said pad and a mating hook-and-loop fabric-like fastener strip on the outer vehicle surface.

15. The protective hardside cover for vehicle surfaces of claim 1 including further sealing means at the junction of the perimeter of the cover and the outer vehicle surfaces comprising a compressible rubber pad affixed to the inner perimeter surface of the cover which is fabricated of a material that is resistant to damage by organic chemical agents.

16. The protective hardside cover for vehicle surfaces of claim 1 including further sealing means at the junction of the perimeter of the cover and the outer vehicle surfaces comprising hard point spacing and support means molded into the inside surface of the cover as a convex protrusion from the inside surface of the cover around the entire perimeter of the protective hardside cover.

17. The protective hardside cover for vehicle surfaces of claim 1 in which the moldable, semi-rigid hardside cover portion material is capable of resisting damage thereto by organic chemical agents.

18. A removable, reusable protective hardside cover for vehicle surfaces comprising:
 a hardside cover portionformed of a sheet of moldable, hard, semi-rigid mateiral impermeable to moisture and dirt, resistant to penetration by ultraviolet radiatoin, and acapable of resisting damage thereto byorganic chemical agents, having a shape and form that are congruent to the vehicle surface over which it fits so that an air space of substantially uniform width exists between the outer vehicle surface to be protected and the inside surface of the hardside cover portion and so that the perimeter of the hardside cover portion and the outer vehicle portion touch snugly to form a junction, in wich the hardside cover portion shet has molded into the surface thereof a multiplicity of ribs which are concave with respect to the vehicle surface to be protected, thus providing a base inside surface of the cover and a rib inside surface of the cover, and which are substantially parallel to each other, wherein said ribs have a maximum depth of at least 0.5 inch and no more than 1.5 inches measured from the base inside surface of the cover; and
 b. means for securing the cover to the vehicle being protected.

19. The protective hardside cover for vehicle surfaces of claim 18 in which the air space between the outer vehicle surface to be protected and the base inside surface of the hardside cover portion is not less than 0.5 inch nor more than 1.0 inch over most of the protected surface, the ribs have a maximum depth in the range of 0.5 to 0.75 inch measured from the base inside surface of the cover, the ribs have a width of from 0.625 to 0.75 inch, and the ribs have a substantially semicircular shape.

20. The protective hardside cover for vehicle surfaces of claim 18 in which the ribs have a width of from 0.5 to 1.0 inch.

21. The protective hardside cover for vehicle surfaces of claim 18 in which the air space between the outer vehicle surface to be protected and the base inside surface of the hardside cover portion is not less than 0.5 inch nor more than 1.5 inch over most of the protected surface, the ribs have a width of from 0.5 to 0.75 inch, and the ribs have a substantially semicircular shape.

22. The protective hardside cover for vehicle surfaces of claim 19 in which the ribs are spaced at least 6 inches apart and no more than 8 inches apart.

* * * * *

UNITED STATES PATENT AND TRADEMARK OFFICE
CERTIFICATE OF CORRECTION

PATENT NO. : 5,255,875

DATED : October 26, 1993

INVENTOR(S) : John M. Maglieri

It is certified that error appears in the above—identified patent and that said Letters Patent is hereby corrected as shown below:

In Column 1, Line 31, change "be4ing" to --being--.

In Column 5, Lines 11-14, change "mated VELCRO is a registered trademark; the fastener is generically known as a hook-and-loop fabric-like fastener strips, or a hard point around the perimeter." to --mated VELCRO strips, or a hard point around the perimeter. VELCRO is a registered trademark; the fastener is generically known as a hook-and-loop fabric-like fastener.--

In Column 5, Line 31, change "inventi,on" to --invention--.

In Column 9, Line 39, change "400°" and "800°" to --40°-- and --80°--, respectively.

In Column 9, Line 67, change "moistur" to --moisture--.

In Column 9, Line 67, insert --and dirt,-- between moistur[e] and and.

In Column 9, Line 68, insert --having a-- between radiation, and shape.

In Column 10, Line 1, delete "s" and insert in its place --surface over--.

In Column 10, Line 2, delete "w" and insert in its place --width exists--.

In Column 10, Line 3, delete "side" and insert in its place --and the inside--.

UNITED STATES PATENT AND TRADEMARK OFFICE
CERTIFICATE OF CORRECTION

PATENT NO.  : 5,255,875
DATED       : October 26, 1993
INVENTOR(S) : John M. Maglieri It is certified that error appears in the above—identified patent and that said Letters Patent is hereby corrected as shown below:

In Column 10, Line 4, change "sidair" to --said air--.

In Column 10, Line 9, change "or" to --for--.

In Column 11, Line 6, insert --surfaces-- between vehicle and comprising.

In Column 11, Line 32, change "portionformed" to --portion formed--.

In Column 11, Line 33, change "mateiral" to --material--.
In Column 11, Line 35, change "radiatoin" to --radiation--.
In Column 11, Line 35, change "acapable" to --capable--.

In Column 11, Line 36, change "byorganic" to --by organic--.
In Column 12, Line 5, change "wich" to -- which--.
In Column 12, Line 5, change "shet" to --sheet--.

Signed and Sealed this

Ninth Day of May, 1995

BRUCE LEHMAN

*Attest:*

*Attesting Officer*          *Commissioner of Patents and Trademarks*